United States Patent [19]

Trumbull

[11] Patent Number: 4,991,801
[45] Date of Patent: Feb. 12, 1991

[54] UNIVERSAL SUPPORT STRAP

[76] Inventor: Terry N. Trumbull, 14933 Royalbrook Dr., Chesterfield, Mo. 63017

[21] Appl. No.: 486,945

[22] Filed: Mar. 1, 1990

[51] Int. Cl.$^5$ .............................................. F16L 3/08
[52] U.S. Cl. ..................................... 248/74.2; 248/62
[58] Field of Search ....................... 248/62, 74.2, 74.1, 248/68.1, 58, 74.5, 911, 316.7; 24/343, 129 B, 546

[56] References Cited

U.S. PATENT DOCUMENTS

| | | | |
|---|---|---|---|
| 1,805,006 | 5/1931 | Neilson | 248/62 |
| 3,194,524 | 7/1965 | Trumbull | 248/74.2 |
| 3,430,904 | 3/1969 | Soltysik | 248/68.1 X |
| 3,486,531 | 12/1969 | Nalodka | 248/74.2 X |
| 3,521,332 | 7/1970 | Kramer | 248/911 X |
| 4,524,936 | 6/1985 | Hurtubise | 248/62 |
| 4,824,057 | 4/1989 | Suprono | 24/129 B X |

FOREIGN PATENT DOCUMENTS 107311  1/1924  Switzerland ............... 248/74.2

Primary Examiner—J. Franklin Foss
Attorney, Agent, or Firm—Gravely, Lieder & Woodruff

[57] ABSTRACT

A body support strap in which a body to be supported is positioned in the strap and the strap is attached to a structural support in any desired position by employing any one of the angularly related web members which receive a screw or bolt to secure the support strap in the position dictated by the angular relation of the strap to the web selected for use.

9 Claims, 1 Drawing Sheet

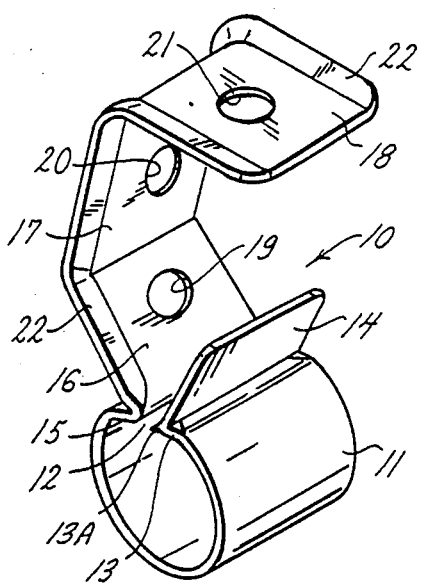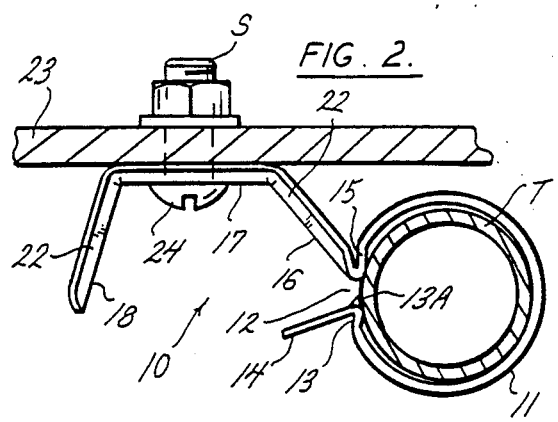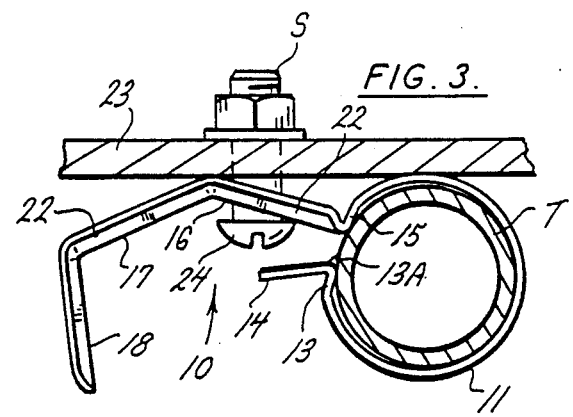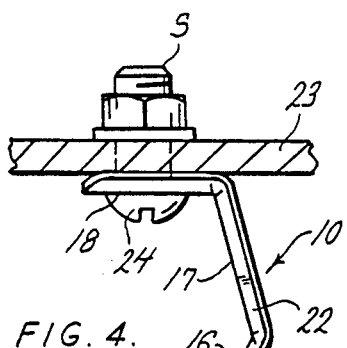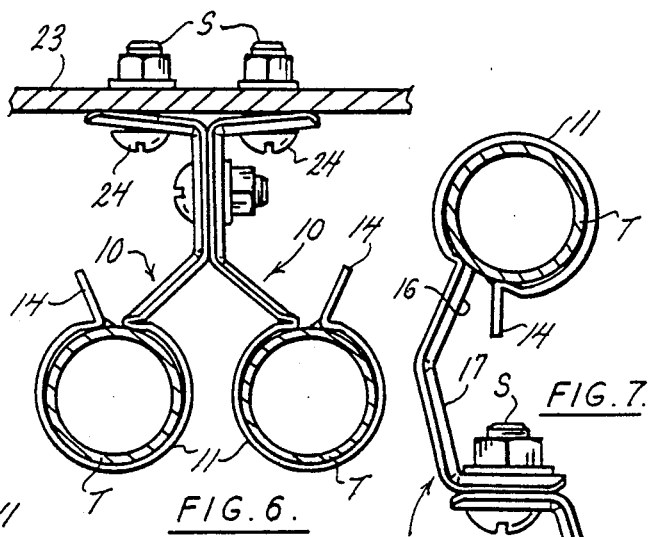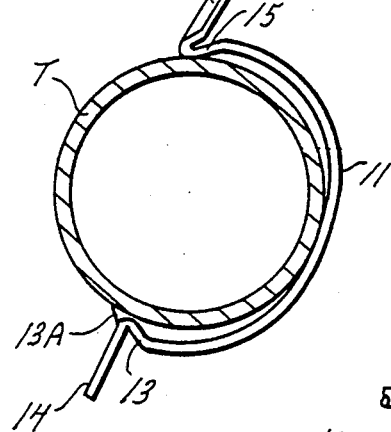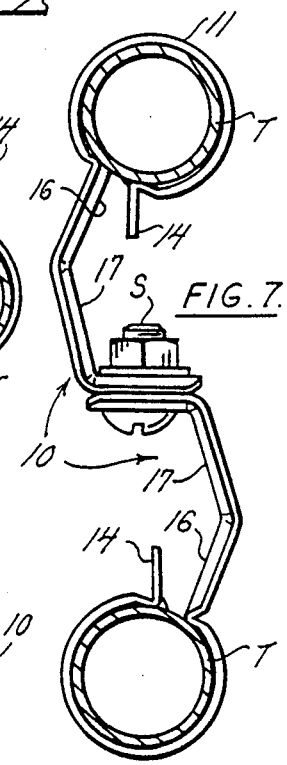

UNIVERSAL SUPPORT STRAP

BACKGROUND OF THE INVENTION

1. Field of the Invention

The subject invention is directed to a strap for engaging conduits, cable and wire bundles and affording choice of support for such objects thereby offering a universal type of support.

2. Description of the Prior Art

There is a continuing need for a type of strap support for many different objects, such as conducts, wire bundles, cable, and the like, that eliminates the need for a collection of straps or clips having almost a one purpose use. Examples of the variations that straps can take are evident in prior art U.S. Pat. Nos. 2,128,005 of Aug. 23, 1936; 2,571,496 of Oct. 21, 1951; 3,526,381 of Sept. 1, 1970; and 3,194,524 of July 13, 1965. Straps or clips of these patents have almost specialized utility, whereas people who work with such straps or clips are required to carry a quantity of each type to a job site so that they will be prepared for any evantuality.

BRIEF SUMMARY OF THE INVENTION

The object of this invention is to provide in one support strap the capability to perform several different functions and work with different objects that require support or anchorage, thereby reducing the number and shapes of support straps.

Another object is to provide a support strap that is almost universal in its adaptability to do many different jobs.

These and other objects and advantages related to the present support strap will become evident in the following specification of a support strap that possesses a unique structural form.

BRIEF DESCRIPTION OF THE DRAWING

The support strap is illustrated in the accompanying drawing views, wherein:

FIG. 1 is a perspective view of the support strap possessing unique characteristics;

FIG. 2 is a side view of the support strap in one position of use;

FIG. 3 is an alternative side view showing a different position of use;

FIG. 4 is a further side view of the support strap in another of its uses;

FIG. 5 is a fragmentary view of a further example of the utility or strap.

FIGS. 6 and 7 are views of other uses for a pair of support straps placed in side by side relation, or in endwise positions.

DETAILED DESCRIPTION

The view of FIG. 1 is a perspective of the support strap 10 as it would appear when loose and not in use. The strap 10 comprises a cylindrical body receiving portion 11 having a width and/or thickness sufficient to provide support for a body passing through that portion 11. The portion 11 is formed with a body receiving entrance 12, one side of which is defined by a flatened surface 13 forming a jaw and an angularly outwardly directed tab 14 along one side of the entrance 12. The surface of the jaw can be formed with projections or burrs or points, collectively indicated as elements 13A. The opposite side of the entrance 12 is defined by a flatened surface 15 forming a jaw which is at the base of a web 16 which is angularly divergent from the tab 14. The parts 13 and 15 operates as jaws for the entrance 12.

The cylindrical body portion 11 is supported by the first web means for attaching the body 10 to a supporting structure, and it will be seen in FIG. 1 that the web 16 is integral with an additional web 17, and that additional web is integral with a third web 18. The respective webs 16, 17, and 18 are angularly directed with respect to each other for the purpose of providing selective positioning of the body portion 11 to appear hereinafter.

Further, in the view of FIG. 2 the body 10 includes a second flat web 17 extending at an angle from the first web 16. Continuing on, web 17 joins with a further web 18. Web 16 provides a screw or bolt hole 19 the web 17 provides a screw or bolt hole 20, and the web 18 also provides a screw or bolt hole 21. The respective webs 16, 17, and 18, are arranged with stiffening means in the form of flanged margins 22 on both sides. The flanges 22 are turned outward to stiffen the respective webs, and for the purpose of providing a lockwasher type load for retaining a screw or bolt or suitable fastener in position.

The view of FIG. 2 shows the body 10 mounted on a structure 23 to retain a tube T within the cylindrical body portion 11. That tube T can be inserted into the strap 11 by pressing it into the tab 14 which opens the jaws 13 and 15. When the strap 11 closes on the tube T, as well as the points 13A, the jaws lock the tube T in position. The body 10 is retained by a stove bolt S or other suitable fastener in which the head 24 seats on the web 17 between the side flanges 22 to provide a firm and rigid attachment for the strap 11. In this view of FIG. 2, the tube T is supported in a slightly raised position off the surface of the structure 23.

The view of FIG. 3 shows the strap portion 11 of the body 10 positioned against the surface of the web 16. In achieving this position, the bolt S has its head 24 pressing at an angle on the web 16. However, the web 16 is not able to bend due to the stiffening action of the flanges 22, thereby retaining the strap portion 11 resting against the surface of the structure 23.

The view of FIG. 4 illustrates a further characteristic of the cylindrical body in which the tube T is supported in a raised position relative to the support 23. The bolt S now is inserted in the hole 21 in the web 18, while the stiffened webs 16 and 17 hold the tube T in a substantially firm position. Also, it is now evident that when a larger body T is to be supported, the expanding of the strap portion 11 places the jaws 13 and 15 in a gripping position to prevent escape of the tube T.

The view of FIG. 5 illustrates an important use for the support strap 10 and that is to employ the strap 10 in the position of FIG. 4 so the tube T is elevated sufficiently to pass over an obstacle A. This is an example where the strap 10 performs a unique function by eliminating the need to bend or shape the tube T to pass the obstacle A. In certain other uses, the support for the tube T, as in FIG. 2, allows the tube T to enter a junction box without the use of an offset bend or offset nipple. The view of FIG. 3 shows a still further use of the body 10, and that is to hold a tube T close to a support surface 25 when it is necessary for the tube T to pass under an obstacle.

It is evident that the support strap 10 has a number of uses which will eliminate the need to purchase a supply of many one-purpose straps or clamps. It also eliminates any trademan's aggravation of hunting in a supply box for a support device to do a job that the present support strap 10 is capable of satisfying. Thus, job time is shortened, and a reduced cost will result. The strap 10 is quite adaptable to many jobs where fluid carrying tubing needs support, or electrical cable or wire bundles need to be secured.

Moreover, the strap 10 may be given a protective coating to provide for electrical insulation, or it may be rust proofed when desired. In addition, the metal strap body 10 is preferably formed of spring material, and the side edges of each of the webs are formed with angularly directed flanges for the purpose of stiffening the webs, as well as making the webs react like a lockwasher when the attachment screw or bolt is tightened up against the web.

The subject invention can be understood as being directed to a body supporting strap for attaching a body in any one of the plurality of positions when the support strap is attached to a supporting structure. In this connection the supporting strap has a portion 11 that receives a body, and the strap is formed with attachment means for selective use in connecting the strap to the supporting structure. The attachment means includes a plurality of interconnected webs that are in alignment and are positioned to project from the strap with the individual webs being angularly related to establish a position of said support portion that substantially corresponds to the angular relation of the web that is selected for attachment to the supporting structure. The individual webs are formed with flanges that stabilize the webs when engaging on the supporting structure and are held in that position by a suitable attaching bolt or screw.

When needed, a combination of several bodies 10 may be interconnected (FIGS. 6 or 7) in abutment of certain of the webs so a plurality of straps 11 can be arranged to support tubing or objects needing to be positioned in pairs, running in adjacency or held in spaced apart positions. In some cases three or more bodies may be interconnected.

It is also to be understood that the invention herein is directed to a body supporting strap comprising a strap means configuration suitable to receive a body for support therein, a jaw means defining a entrance to the strap means so as to allow a body to pass into the strap means, and jaw means adapted to retain a body in said strap means. The supporting strap means is provided with web means having a predetermined surface configuration which provides for positioning the strap in accordance with a predetermined configuration of the surface, and means on the strap for operating the entrance to the strap means. Certain modifications are understood to be within the scope of the invention wherein the jaw means includes substantially flat surface defining the opposite sides of the entrance to the strap, and wherein the supporting strap has a generally cylindrical shape so that it can encircle a body and position it between the jaw means. Other modifications are, of course, contemplated within the scope of the present disclosure.

What is claimed is:

1. A body supporting strap for attaching a body received in the supportive strap in any one of a plurality of positions from a supporting structure, said body supporting strap comprising:
    (a) a cylindrically shaped portion to receive a body for support, said portion having an entrance opening through which a body can pass; and
    (b) strap attachment means connected to said cylindrically shaped portion in position for selective use in attaching said body receiving portion to a supporting structure, said body receiving portion attachment means including,
        (1) a plurality of interconnected and aligned webs projecting from said body receiving portion with said individual webs being angularly related to establish a position of attachment of said cylindrically shaped body receiving portion that corresponds to the angular relation of the web that is selected for attachment to the supporting structure, and
        (2) each said web having marginal flange means angularly divergent therefrom to render the web stable when attached to the supporting structure by any selected one of said webs.

2. A support strap for securing an object to a support structure in a substantially stable position by applied attachment means engaged in a support structure, said support strap comprising:
    (a) a strap portion of generally cylindrical configuration having an opening to the interior of said cylindrical strap portion to receive an object to be secured to a support structure;
    (b) first, second, and third webs extending from said strap portion, said first web being next to said strap portion to assume an angular relation thereto, said second web being a continuation of and extending at an angle from said first web, and said third web being a continuation of said second web and extending at an angle from said second web; and
    (c) an aperture formed in each of said webs to receive an applied attachment means in any one of said webs for locating said strap portion in a position relative to a support structure determined by the relative angular relationship of the selected web.

3. A body supporting strap comprising:
    (a) a body receiving portion formed of spring material and shaped to receive a body for support therein;
    (b) jaw means defining an entrance to said receiving portion for said strap, said jaw means being separable to pass a body into a strap, said jaw means having elements adapted to retain a body received in said receiving portion;
    (c) a plurality of web means projecting from said body receiving portion, said web means being connected by marginal flanges in angularly related predetermined surface configurations which provides for positioning a body in space by said strap in accordance with which one of said web surface configuration is selected for establishing a body supporting position; and
    (d) means cooperating with said jaw means for operatively opening said entrance to pass a body.

4. The body support strap set forth in claim 3 wherein said jaw means includes substantially flat surfaces defining the opposite sides of said entrance, and said body is a cylindrically shaped body extending between said jaw means and encircling a body to be supported therein.

5. The body support strap set forth in claim 3 wherein said predetermined surface configuration of said web means includes different angles for determining the spatial location of said body receiving portion.

6. A combination of body support straps arranged in paired abutment comprising:

(a) each of said body support straps having a body receiving portion, and a plurality of web means projecting from said body receiving portion, said web means being stiffened by marginal flanges and being directed relative to said body receiving portion in diverging angular relationships with each other; and (b) fastener means retaining a pair of web means with common angularly complementary relationships in abutment to fix the body receiving portions in a predetermined spatial relation to each other.

7. The combination set forth in claim 6 wherein said pair of web elements in abutment have complementary angular relationships which position said body receiving portions in spaced adjacency.

8. A combination of body support straps arranged in pairs for joint cooperation with each other, said body support strap in each pair comprising:

(a) a substantially similar body receiving portion formed with a plurality of web means integrally formed with said body receiving portion and projecting therefrom in a line in which said web means are directed at different angular positions relative to said body receiving portion;

(b) said web means from each body support strap being selected to be placed in abutment at similarly shaped common angular position for locating said body receiving portions selectively adjacent or in remote spaced relationship;

(c) fastener means retaining said pairs of body support straps in said selected abutment as determined by said similarly shaped common angularly shaped web means.

9. A body support strap for attaching a body to a support selectively in any of a plurality of positions; said support strap comprising:

(a) a body receiving portion having an opening thereto;

(b) a first web element extending at an angle from said body opening; and (c) a second web element extending from said first web element and assuming an angular relationship thereto;

(d) a third web element extending from said second web element and assuming an angular relationship different from the first and second web elements;

(e) said first, second and third web elements being integrally formed with said body receiving portion;

(f) an aperture formed in each one of said web elements to receive an element adapted for positioning said body receiving portion in any one of a spaced position according to the angular relationship of the one web element selected to be secured; and (g) securing means attaching a body support strap to a support by said selected web element.

* * * * *